Sept. 21, 1948.　　　　R. L. KEIFFER　　　　2,449,655
COATING APPARATUS FOR TUBULAR OBJECTS
Filed May 11, 1944
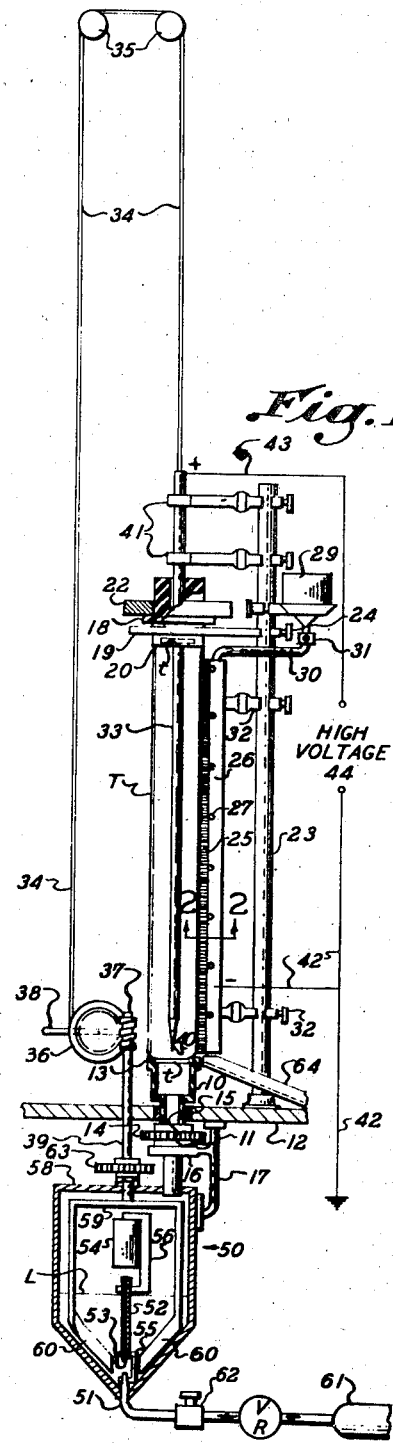
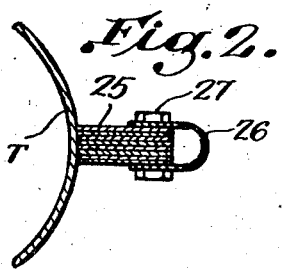
INVENTOR:
RAYMOND L. KEIFFER,
BY John H Anderson
HIS ATTORNEY Patented Sept. 21, 1948

2,449,655

UNITED STATES PATENT OFFICE 2,449,655

COATING APPARATUS FOR TUBULAR OBJECTS

Raymond L. Keiffer, Cleveland Heights, Ohio, assignor to General Electric Company, a corporation of New York Application May 11, 1944, Serial No. 535,164

1 Claim. (Cl. 91—18)

This invention relates to apparatus for the coating of surfaces with finely divided materials, and is particularly advantageous for coating walls such as the insulative envelopes or bulbs of electrical devices like electric lamps, which at present are generally vitreous. and commonly of soft glass like lead or lime glass, or of borosilicate glass such as that which is commercially known as "Pyrex." The invention is very useful for internally coating thin-walled glass enclosures with powders intended to modify their transmission of light or other radiation; or with special internal protective glaze powders, to be afterward fused on; or with luminescent materials or phosphors in a state of fine division. It is hereinafter explained with particular reference to the coating of phosphors on the interior of ordinary fluorescent tubes of the usual low-pressure positive column discharge type, as well as to coating phosphors on the target ends of cathode ray tubes such as Braun tubes.

The internal coating of glass enclosures with finely divided materials by electrical deposition or precipitation has heretofore been attended with but limited success. In the first place, the adherence of the coating thus produced has been much less than is to be desired. In the second place, it has been necessary to heat the article to render the glass conductive when electrically depositing the fine particles. In this method, the heating flame also affords electrical connection to the glass.

I have discovered an improvement in apparatus for carrying out the electrical deposition or precipitation which results in a strongly adherent coating. Also, my apparatus makes it possible to dispense with heating the vitreous article to render it conductive. As applied to the coating of fluorescent tubes with phosphors, furthermore, my invention allows great simplification of technique and equipment as compared with present methods of coating tubes with phosphors suspended in liquid by means of carbonaceous binders, and results in corresponding reduction of cost. It does away with the use of organic binders for the phosphors, such as nitrocellulose, and with solvents therefor, which offer a serious fire hazard; it does away with operations and equipment required to incorporate the phosphor with the binder and to apply the resulting fluid coating mixture to the tubes, such as ball-milling and ball-mills, storage tanks for the fluid suspension, and arrangements for running the fluid into the tubes to be coated and out again; it does away with drying the coated tubes and afterward baking or burning the organic binder out of the coating, and with drying ovens and baking lehrs for this purpose. Thus tubes go directly from cleaning and straightening to coating with phosphor, and from coating directly to the sealing-in operation.

As inequalities of tube wall thickness do not produce irregular phosphor coatings by my apparatus, tubing that was formerly rejected becomes perfectly usable. Moreover, phosphor coatings produced by my apparatus show substantially greater luminous output than those produced by present methods.

In coating a bulb or tube with fine powder according to my invention in one species hereinafter described, the tube is rotated with an external electrical contact engaging it linearly across or along the zone or length to be coated; an internal electrode, preferably sharp like a needle-point or a razor-edged disc, is moved through the revolving tube across or along said zone or length, though out of contact with the tube wall; an electrical potential high enough to produce a corona discharge through the space between said electrode and the tube wall where the external contact engages it is applied between said internal electrode and said external contact; and the finely divided coating material is introduced and dispersed in the field of potential around the sharp electrode adjacent the wall. Or in coating a cathode ray tube target wall, an electrical contact is applied and maintained in external contact with the end wall throughout an area to be coated internally; the internal electrode is brought into proximity to said area inside the tube or bulb, and the high potential is applied between the contact and the electrode; and a dispersion or smoke of the fine particles is introduced into the field around the internal electrode. In some cases, it may be advantageous to move the external contact and the wall relative to one another while the potential is applied and the divided material introduced.

Various features and advantages of the invention will appear from the description of species and forms of embodiment, and from the drawings.

In the drawings, Fig. 1 is a side view of an apparatus suitable for internally coating a tube according to my invention, with certain parts in vertical mid-section; and Fig. 2 shows a cross-section of a contact and its mounting, taken as indicated by the line and arrows 2—2 in Fig. 1.

The apparatus is shown in Fig. 1 as arranged to treat tubes T in an upright position. For supporting a tube T upright and allowing it to be rotated, an insulative hollow head or holder 10 has its reduced hollow shaft extension 11 journalled on and adjacent a supporting platform or table 12 to revolve about a vertical axis, and is provided with a top lip 13 to fit around the usual reduced lower end t of tube T. It is convenient to rotate tube T by driving the head 10 by a suitable connection to a sprocket 14 keyed fast to shaft 11 below table 12. A suitable rate of rotation is about 180 R. P. M. for a T12 tube of 1½ inch external diameter, although the speed is not very critical. As shown, shaft 11 has journal bearings 15, 16 in table 12 and in bracket 17 secured to the bottom of this table. For rotatably supporting the upper end of tube T, there is shown an insulative sleeve 18 journalled in a bracket 19 with some freedom for vertical movement, and provided at its lower end with a lip 20 to fit around the usual reduced upper end t of tube T. A heavy metal ring 22 fixed around sleeve 18 holds its lip 20 down on tube T and holds tube T down against the lip 13 of holder 10, but allows tube T to be lifted to insert or free its lower end t and then lowered to secure or free its upper end t. Lips 13, 20 may be formed of yielding friction material such as elastic vulcanized rubber, or faced therewith, to insure rotation of parts 10, T, 18 together. Bracket 19 may be carried by a supporting upright rod 23 upstanding from table 12, and provision may be made for adjusting bracket 19 up or down to accommodate tubes T of different lengths, as by means of a screw clamp 24 embracing rod 23.

An electrical contact 25 for making linear external contact with the tube T substantially throughout its length is shown as comprising a porous, fibrous contact strip mounted in a stiff tubular metal backing 26 formed by a stout strip of sheet metal folded lengthwise to a U-section, the strip 25 being clamped between the superposed margins of the strip 26 by screw bolts 27 taking through the margins at suitable intervals, Fig. 2. The lower end of the tubular backing 26 may be closed by bending and welding its sides together, and a conductive liquid such as ordinary tap water (which usually contains enough mineral salts in solution to make it a weak electrolyte) may be supplied to the upper end of the hollow backing 26 from a reservoir 29 insulatively mounted on the upright 23 (by means of an adjustable and removable bracket having a screw clamp similar to the clamp 24) through a tube 30 equipped with a stop and regulating valve 31. The contact device 25 may be supported from the upright 23 by means of adjustable and removable insulative brackets 32 having screw clamps similar to the clamp 24. A suitable porous material for the contact strip 25 is cotton wicking such as used for oil stoves. It is preferably cut crosswise into strips about an inch wide, which are arranged and fitted end to end in the backing 26, with their capillaries extending horizontally. Because of the natural elasticity and flexibility of this material, the contact 25 yields locally in conformity to the tube wall, while pressing resiliently against it.

An internal electrode for the tube T is shown as comprising a long metal rod 33 conically tapered to a point at its lower end and arranged for lengthwise movement up and down or outward and inward in the tube T. As a means for thus moving the rod 33 is shown a flexible cord or cable 34 centrally connected to the upper end of the rod and extending up over one or more pulleys 35, and then down to a winding drum or spindle 36 driven (through suitable reduction gearing 37 and a clutch that is indicated by its operating handle 38) from an upright drive shaft 39 that is further described hereinafter. To facilitate keeping the electrode point needle-sharp, it may consist of a separate steel needle 40 removably mounted in an axial bore in the rod 33. The rod 33 may be guided accurately in its up and down axial movement by means of guide brackets 41 adjustably and removably secured to the upright 23, as by insulating screw clamps more or less similar to the clamp 24. However, extremely accurate centering of the electrode point 40 in the tube T is not practically necessary. A suitable rate of linear movement for the rod 33 during the coating operation is a rise of about 6 ft. per minute. In general, the coating thickness is inversely proportional to the rate of travel of electrode point 40.

For applying high electrical potential between contact 25 and electrode point 40, flexible leads 42, 43 may extend from the lower end of contact backing 26 and the upper end of rod 33 to any suitable high voltage source 44, preferably ordinary D. C. rather than pulsating D. C. The polarity of the connections is not very important, although I at present prefer to make backing 26 negative and rod 33 positive. The voltage used should be such as to produce a corona discharge through the space between the electrode point 40 and the tubular bulb wall T: i. e., a diffuse discharge of positive characteristic which is accompanied by only slight ionization of the gaseous atmosphere in the tube T, and is neither a spark nor a glow. In practice, a voltage in the range of some 8,000 to 12,000 volts is generally satisfactory for internally coating the "T12" tubes T commonly used for 40 watt fluorescent lamps, and 10,000 volts has been found to be a good working value. Voltages that are too low result in very light, poorly adhesive coatings, while voltages that are too high tend to produce corona traces or "crows' feet" in the coating. An electrode 33 that is not sharp enough may require higher voltages to produce a corona discharge and a coating, which is undesirable.

As shown in Fig. 1, the finely divided coating material in gaseous suspension is introduced through the hollow shaft 11 and holder 10 into the end of tube T opposite the electrode point 40, rather than into the other tube end around rod 33. Any suitable "smoke" or "fog" generator may be used to bring the fine particles into suspension, the aim being to suspend the maximum amount of powder in the minimum amount of air or other gas. Phosphor powder so fine that 95% passes through a 200 mesh screen works very well. For the convenience of those desiring to practice my invention, details of one suitable smoke or fog generator 50 are illustrated and described.

As shown in Fig. 1, the smoke generator 50 comprises a circular chamber having a conical hopper bottom and a central tapering elastic fluid jet tube 51 directed axially upward through this bottom. Above and aligned with the jet tube 51 is an axial mixing tube or "chimney" 52 with a conically flared mouth 53 at its lower end. Above and axially aligned with the tube 52 is a hard, massive target 54. These parts may advantageously be made of hard, non-corrosive material. As shown, the mixing tube 52 is supported from the jet tube 51 by a thin, wide rigid connection 55 lying in a radial plane, and the target 54 is supported from the tube 52 by a similar coplanar connection 56. The vertical shaft 39 already referred to is shown as coaxial with the chamber 50 and as journalled through the removable chamber top 58, and carries at its lower end a cross-bar 59 whose ends are bent downward to carry sloping paddles or stirrers 60 which constantly agitate and feed the powder into the center of the hopper between the jet 51 and the mixer-tube mouth 53. The initial level of the powder in the chamber 50 is indicated by the line L as at mid-height, somewhat below the top of the mixing tube 52. Any suitable elastic-fluid may be supplied through jet 51 to blow and suck the powder up through mixing tube 52 and drive it against target 54, such as air or nitrogen supplied from a pressure cylinder 61 through a control and regulating valve 62, the main requirement being that the gas should be inert toward the powder. A device with a chamber 50 about 6 in. in diameter and about twice as deep works well with a jet tube 51 externally and internally tapered to a thin-walled opening 0.035 inch in diameter, a mixing tube 52 of 0.09 inch internal bore about 6 inches long spaced 5 mm. above the top of the tube 51, a target 54 about ½ inch in diameter and 1 inch long spaced 5 mm. above the top of the tube 52. A suitable rate of rotation for the stirrers 60 is about 180 R. P. M., although this speed is not critical. As shown, the shaft 39 is equipped with a sprocket 63 by which it may be driven from the same electric motor (not shown) that drives the head 10 and the tube T, which may revolve at about the same speed as the stirrer 60, say 180 R. P. M., as already mentioned.

A sloping drain trough 64 is shown in Fig. 1 to carry off any drip from the lower end of contact 25.

Using the apparatus described, the coating of a 1½ inch tube T may be carried out as follows.

The contact strip 25 being kept well moistened by a regulated flow of water from the reservoir 29, and the D. C. potential of some 10,000 volts more or less being applied between the parts 25 and 33, producing a corona discharge current of some 150 microamperes across the space between electrode tip 40 and the tube wall, the motor that rotates tube T and stirrer 60 is started to drive them at some 180 R. P. M. Rod 33 having been lowered into tube T to or beyond the position shown, with its point 40 about level with the lower tube end t, elastic fluid from tank 61 is admitted to jet 51 through control valve 62, thus blowing the powder against target 54 with sufficient force to disrupt any aggregations or lumps into ultimate fine particles. Thus the fine particles are scattered into the upward moving elastic fluid in chamber 50, and are carried up through tube 11 and head 10 into the lower end of tube T and into the field of potential around electrode point 40, adjacent the tube wall. As the fog of fine particles in gaseous suspension appears around electrode point 40, clutch 36 is thrown in to connect winding spindle 36 to be driven by shaft 39, thus winding cord 34 and drawing electrode point 40 slowly upward through tube T as the fog rises therein. Being electrically charged from electrode 40 to the negative or positive potential prevailing around it, the fine powder particles repel each other and fly outward toward the tube wall, to which they are attracted by the opposite polarity there. The action is continued until the tube T is internally coated right up to its upper end t, when the fluid supply is shut off at 62 and the movement of the rod 33 stopped. In general, a single operation produces an adequate internal phosphor coat; but the operation can be repeated if a thicker layer is desired.

The coating adheres very firmly, so that the upright tube T can be removed from the apparatus and its lower end struck smartly against the floor without dislodging more than a very small amount of powder particles that were less securely held than the rest. A repetition of the same jar will then fail to bring out an additional amount of powder; and it will be found that the coating on the tube wall remains perfectly uniform, and apparently just as heavy as originally.

While the benefits of my invention are not dependent on the correctness of any theory, there is reason to believe that the radically greater adherence of the deposited particles to the vitreous wall produced by my process, as compared to prior processes of electro-deposition, is due to the concentrated intensity of the effective field of potential between the external contact 25, and the internal part 40: i. e. partly to the fact that the glass wall is not heated and rendered conductive all around, and partly to the intimacy of contact between the glass and the contact 25, as contrasted with the flame connection to the glass in prior practice.

What I claim as new and desire to secure by Letters Patent of the United States is:

In apparatus of the character described, the combination of means for supporting and rotating a vitreous bulb; external contact means for making linear external contact with the bulb wall across a zone to be internally coated comprising a longitudinally slit tube with a fibrous strip mounted in its slit for bearing against the bulb outside the tube, and means for supplying conductive liquid to said tube to keep the strip moist therewith; an internal corona discharge electrode, with means for moving it through the bulb across said zone while the bulb is supported and rotated as aforesaid; means for applying between said contact means and said electrode an electrical potential high enough to produce a corona discharge through the space between said electrode and the bulb wall; and means for introducing the finely divided material in dispersion into the field of potential around the electrode inside the bulb.

RAYMOND L. KEIFFER.

REFERENCES CITED

The following references are of record in the file of this patent:

UNITED STATES PATENTS

| Number | Name | Date |
| --- | --- | --- |
| 116,197 | Kidder | June 20, 1871 |
| 1,698,845 | Gustin | Jan. 15, 1929 |
| 1,989,282 | Kimble | Jan. 29, 1935 |
| 2,128,327 | Russell et al. | Aug. 30, 1938 |
| 2,336,946 | Marden et al. | Dec. 14, 1943 |

FOREIGN PATENTS

| Number | Country | Date |
| --- | --- | --- |
| 117,797 | Australia | Dec. 2, 1943 |